(12) United States Patent
Pierson et al.

(10) Patent No.: US 9,446,564 B2
(45) Date of Patent: Sep. 20, 2016

(54) POLYURETHANE BASED RIGID FLOORING LAMINATE

(75) Inventors: Robert G. Pierson, Akron, OH (US);
Henry C. Ashton, Aurora, OH (US);
Robert L. Gray, Hudson, OH (US);
Gilles Le Dû, Akron, OH (US)

(73) Assignee: SCHNELLER LLC, Kent, OH (US)

( * ) Notice: Subject to any disclaimer, the term of this patent is extended or adjusted under 35 U.S.C. 154(b) by 577 days.

(21) Appl. No.: 12/716,502

(22) Filed: Mar. 3, 2010

(65) Prior Publication Data

US 2010/0227132 A1    Sep. 9, 2010

Related U.S. Application Data

(60) Provisional application No. 61/156,980, filed on Mar. 3, 2009.

(51) Int. Cl.
*B32B 15/095* (2006.01)
*B32B 7/12* (2006.01)
(Continued)

(52) U.S. Cl.
CPC ............... *B32B 7/12* (2013.01); *B32B 5/022* (2013.01); *B32B 5/024* (2013.01); *B32B 5/22* (2013.01); *B32B 5/26* (2013.01); *B32B 27/08* (2013.01); *B32B 27/12* (2013.01); *B32B 27/18* (2013.01); *B32B 27/20* (2013.01); *B32B 27/281* (2013.01); *B32B 27/285* (2013.01); *B32B 27/286* (2013.01); *B32B 27/302* (2013.01); *B32B 27/304* (2013.01); *B32B 27/308* (2013.01); *B32B 27/34* (2013.01); *B32B 27/36* (2013.01); *B32B 27/38* (2013.01); *B32B 27/40* (2013.01); *B32B 2255/00* (2013.01); *B32B 2255/26* (2013.01); *B32B 2260/021* (2013.01); *B32B 2260/046* (2013.01); *B32B 2262/02* (2013.01); (Continued)

(58) Field of Classification Search
CPC ....... B32B 27/04; B32B 27/12; B32B 27/40; B32B 7/12
USPC ............ 428/160, 201, 423.3, 212, 219, 423, 428/413
See application file for complete search history.

(56) References Cited

U.S. PATENT DOCUMENTS 3,882,191 A * 5/1975 Balatoni et al. .............. 525/125
6,607,627 B2   8/2003 Nelson
(Continued)

FOREIGN PATENT DOCUMENTS

EP    1493878    1/2005
EP    1803869    7/2007
(Continued)

OTHER PUBLICATIONS

Ukielski, R. New multiblock terpoly(ester-ether-amide) thermoplatic elastomers with various chemical composition of ester block, (2000), Elsevier, Polymer 41, pp. 1893-1904.*

*Primary Examiner* — Peter Y Choi
*Assistant Examiner* — Vincent A Tatesure
(74) *Attorney, Agent, or Firm* — Hahn Loeser + Parks LLP; Scott M. Oldham (57) ABSTRACT

Multiple layer laminates contain predominantly urethane-based polymeric materials in cap and base layers, and no significant amount of PVC. Under combustion conditions, the laminate releases substantially no harmful halogen-based bases, such as HCl or other toxic gases, and exhibits low toxicity and smoke generation.

11 Claims, 2 Drawing Sheets

(51) Int. Cl.
*B32B 27/12* (2006.01)
*B32B 27/40* (2006.01)
*B32B 5/02* (2006.01)
*B32B 5/22* (2006.01)
*B32B 5/26* (2006.01)
*B32B 27/08* (2006.01)
*B32B 27/18* (2006.01)
*B32B 27/20* (2006.01)
*B32B 27/28* (2006.01)
*B32B 27/30* (2006.01)
*B32B 27/34* (2006.01)
*B32B 27/36* (2006.01)
*B32B 27/38* (2006.01)

(52) U.S. Cl.
CPC *B32B 2262/0223* (2013.01); *B32B 2262/0269* (2013.01); *B32B 2262/065* (2013.01); *B32B 2262/101* (2013.01); *B32B 2262/106* (2013.01); *B32B 2270/00* (2013.01); *B32B 2307/50* (2013.01); *B32B 2307/554* (2013.01); *B32B 2307/5825* (2013.01); *B32B 2307/72* (2013.01); *B32B 2307/734* (2013.01); *B32B 2307/75* (2013.01); *B32B 2471/00* (2013.01); *B32B 2605/00* (2013.01); *Y10T 428/24851* (2015.01); *Y10T 428/24942* (2015.01); *Y10T 428/31511* (2015.04); *Y10T 428/31551* (2015.04); *Y10T 428/31554* (2015.04)

(56) References Cited

U.S. PATENT DOCUMENTS

| | | |
|---|---|---|
| 2003/0221387 A1 | 12/2003 | Shah |
| 2004/0058603 A1* | 3/2004 | Hayes .................. 442/286 |
| 2004/0146706 A1* | 7/2004 | Kasai et al. ............. 428/328 |
| 2004/0211130 A1 | 10/2004 | Horstman et al. |
| 2008/0233364 A1* | 9/2008 | Larson et al. ........... 428/196 |
| 2009/0252937 A1* | 10/2009 | Zeik et al. .............. 428/195.1 |

FOREIGN PATENT DOCUMENTS

| | | |
|---|---|---|
| EP | 1811103 | 2/2009 |
| GB | 2389075 A | * 12/2003 |

* cited by examiner

POLYURETHANE BASED RIGID FLOORING LAMINATE

RELATED APPLICATION

This application claims priority to U.S. provisional patent application No. 61/156,980, filed on Mar. 3, 2009, which is incorporated herein by reference.

FIELD OF THE INVENTION

The present invention relates to multi-layered rigid flooring laminates and to a method for making the same. More specifically, the present invention relates to multi-layer laminates having reduced toxicity and smoke levels during combustion, as well as improved dimensional stability, and methods of producing the laminates.

BACKGROUND OF THE INVENTION

Decorative and structural panels for architectural and transport vehicle applications commonly take the form of laminates having a surface layer and a reinforcement layer. The surface layer often includes a decorative layer, or outer cover, affixed to a substrate layer that provides rigidity, the laminate as a whole exhibiting laminate weights of about 3,000 grams per square meter. Decorative laminates typically have a visible layer that exhibits an embossed texture, or a print pattern, or a combination of these and other aesthetic design features.

In transport vehicle applications, laminates employed as surface-covering materials must meet industry established standards with regard to not only the release of toxic fumes or gases upon combustion, including those released with smoke, but also the amount of smoke created during the combustion process. It is further desirable to be able to manufacture laminates meeting industry standards that display uniformity of the texture and print pattern design features of the decorative portion of the laminate. This can be difficult to achieve as any decorative feature must maintain its integrity throughout the manufacturing process. Non-textile flooring (NTF) laminates are generally constructed using multiple layers of various films laminated together under high temperature and pressure, and/or embossed, again at high temperature and pressure, at different stages in a continuous roll-forming manufacturing process.

Conventional methods for the manufacture of such laminates are limited by the properties of the materials used which impose limitations on the extent to which the combined layers can be heated, stretched and further processed in casting and roll-forming machinery without adversely affecting the dimensional stability of the final product or the performance characteristics of the various laminate layers. Laminates have three basic dimensions which can be represented by reference to x, y, and z axis, where the z-axis represents the thickness of the laminate. In conventional laminates, permanent distortion occurs along the x or y axis, or both, when the laminate is heated and stretched in one or more directions as a result of forces applied in a mechanical lamination process. As the laminate cools it retains such distortion.

Conventional laminates used in the industry include one or more layers containing PVC (polyvinyl chloride). PVC laminates provide a low cost laminate option that is durable and low maintenance. This type of surface laminate resists abrasion and impact damage, making its use for flooring in high traffic areas attractive. For some time, PVC-containing laminates have been the best available choice for use in the transportation industry. However, those laminates containing PVC exhibit high levels of toxicity and smoke generation upon combustion, presenting a concern in industrial applications, and particularly air transport applications.

In addition, currently employed laminate structures are of a construction which results in a higher than desired weight to ensure rigidity and stability. These structural laminates, though they provide adequate performance characteristics for aviation flooring and are available in the form of sheets, also have dimensional limitations which can result in unnecessary waste in end-use applications.

SUMMARY

The present invention provides for various laminate constructions, suitable for use as flooring and/or industrial laminate applications, that exhibit desired aesthetic properties, for example texture and graphical features, and that also exhibit low toxicity and smoke levels upon combustion, meeting and exceeding aviation industry standards. In one embodiment, a dimensionally stable, multi-layered laminate structure includes a backing layer, having by weight from about 20% to about 80% thermoset or thermoplastic polymer selected from polysulfone, polyester, phenolic, epoxy acrylic and vinylester and mixtures thereof, and from about 20% to about 80% reinforcement fiber. The backing material may be primed to accept the adhesive or promote the adhesive by use of a primer material such as (insert material designations). The multi-layered laminate further includes an adhesive and primer to bind, the backing layer to a first surface of a base layer. The primer may be a polyurethane thermoplastic or thermoset, an epoxy or any other suitable polymer. The base layer includes an alloy comprising polyurethane in combination with a homopolymer or copolymer. The homopolymer or copolymer may be selected from a combination of known polymers, including but not limited to polyamide, polyester, polyether, polyimide, polyphenylene oxide, polystyrene, acrylic and combinations thereof. In one embodiment, the copolymer comprises a terpolymer that may contain, for example, polyamide, polyester, and polyether, such that the base layer as a whole includes from about 10% to about 100% polyurethane, and from about 10% to about 100% terpolymer, the terpolymer including from about 10% to about 100% of each of the polyamide, polyester, and polyether components. Finally, a cap layer of polyurethane is provided on a second surface of the base layer. Generally, the polyurethane cap layer is clear, but it may also contain a colorant. The laminate structure is intended to be lightweight and exhibits an aerial density of about 2300 grams per square meter or less.

In additional embodiments, the laminate structure may further include one or more decorative layers to enhance the aesthetics of the laminate surface. This layer, or these layers, may be disposed between the cap layer and the base layer. For example, options for creating a more aesthetic laminate appearance include: the addition of pigment to, for example, the cap and/or an adhesive layer; printing the back side of the cap layer; adding an additional layer of print material between the cap layer and an adhesive layer of the base layer; or any combination thereof.

In one embodiment, the laminate structure includes a backing layer of about 1 to about 100 mils in thickness, more preferably about 10 to 60 mils in thickness and most preferably between 10 and 40 mils in thickness. It further includes a base layer of about 1 to about 50 mils thickness, or in some embodiments about 10 to about 35 mils thick, and in still other embodiments about 28 mils thick. There is also included a cap layer of about 1 to about 15 mils thickness, or in some embodiments about 3 to about 10 mils thick, and in still other embodiments about 8 mils thick. Additional layers which are optionally present may include adhesive and decorative layers, and each may be from about 0.3 to about 3 mils thick or in some embodiments about 1 to about 2 mils thick, and in still other embodiments about 1 mil thick. The thickness of any particular layer or combination of layers is determined based on such factors as the desired thickness of the overall laminate product, as well as the thickness necessary for the layer to provide the desired function.

In any of the embodiments described above, in accordance with the present invention, the method for making a laminate structure includes known laminate processing techniques. For example, known roll-forming processing techniques may be used. In one embodiment, the method includes applying roll-forming processing used to first prepare the base layer 24, which includes a urethane/copolymer mix sub layer 24a, a PVC urethane primer sub layer 24b, a glass fiber mat sub layer 24c, and a PVC seal sub layer 24d and then laminate the base layer 24 to a backing layer 22 which comprises glass or other fiber material in a thermoset or thermoplastic polymer matrix. The base layer and the backing layer are laminated at a temperature ranging from about 170° F. to about 340° F. In the base layer, sub-layer 24c comprises a woven or non-woven glass fiber material, pretreated by being disposed in a thermoset or thermoplastic polymer selected from the group of: polyester, phenolic, epoxy, polysulfone, acrylic and mixtures thereof. The base layer further includes sub-layer 24a comprising at least one polymer selected from polyurethane, polyamide, polyester, polyether, polyimide, polyphenylene oxide, polystyrene or any of these polymers in combination with any other of these polymers. For example, polyurethane may be used alone, or in combination with a homopolymer or copolymer, for example a terpolymer. In example embodiments, the continuous roll-formed laminate has an aereal density of about 2300 grams per square meter or less, or even 2100 grams per square meter or less. In example embodiments, the laminate provided exhibits toxicity and smoke parameters which are well below the accepted ABS 0031 Standards used throughout the air transport industry.

BRIEF DESCRIPTION OF THE DRAWINGS

The various embodiments of the present invention can be understood with reference to the following drawings. The components in the drawings are not necessarily to scale. Also, in the drawings, like reference numerals designate corresponding parts throughout the views.

DETAILED DESCRIPTION OF THE INVENTION

The laminate according to the invention is a multiple layer structure and contains predominantly urethane-based polymeric materials in the cap and base layers thereof, with no significant amount of PVC. As such, under combustion conditions, the laminate releases substantially no harmful halogen-based bases, such as HCl or other toxic gases, and exhibits toxicity and smoke generation parameters well below acceptable industry standards.

Figure 1:
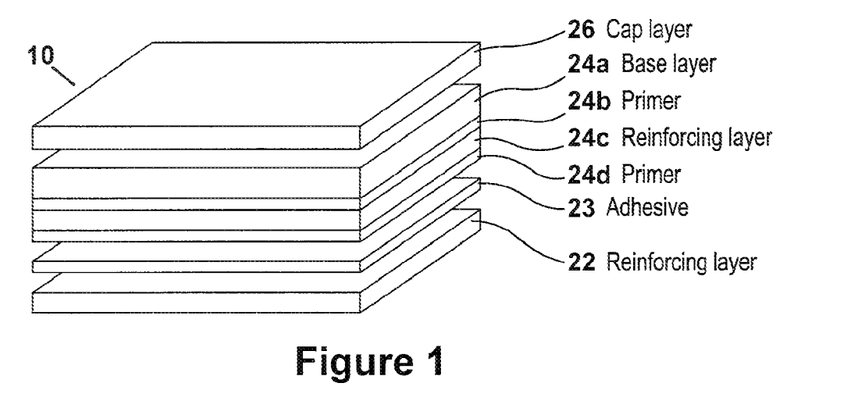
FIG. 1 is a perspective illustration of a laminate structure, according to an embodiment of the present invention.

FIG. 1 is an exploded perspective illustration of a laminate structure 10 according to an embodiment of the present invention. According to FIG. 1, laminate structure 10 includes a backing layer 22 and a base layer 24 and a cap layer 26.

The backing layer 22 includes a fiber-reinforced thermoset polymer made from woven or non-woven fibers impregnated in a thermoset or thermoplastic polymer resin matrix. Suitable resins include, but are not limited to, saturated- or unsaturated-polysulfone, -polyphenolsulfone, -polyester, -phenolic resin, -epoxy resin, and mixtures thereof. The term "unsaturated' is used in reference to a thermoset polymer including a molecule having one or more carbon-carbon double bonds, and capable of further polymerization in a curing process, for example, by exposure to elevated temperatures. Once the "unsaturated" polymer has been cured and is present in the laminate structure, it is no longer referred to herein as an "unsaturated" polymer even though it may not be fully saturated in the cured state. For example, in various embodiments of the manufactured laminate structure in which polyester is present in the reinforcement layer, or the adhesive layer, or both, the polymer is referred to herein as "polyester" even though it may not be fully saturated in the cured state of the laminate structure.

The amount, by weight, of resin present in the backing layer 22, can range from about 20% to about 80%, in another embodiment from about 30% to about 70%, and in another embodiment from about 40% to about 50%. In one embodiment, the backing layer 22 contains, by weight, from about 20% to about 80% reinforcement fiber, and in another embodiment, from about 30% to about 70% by weight fiber, and in yet another embodiment from about 50% to about 60% by weight fiber. The fiber may be glass, aramids, carbon, polyvinyl alcohol (PVA), hemp, jute, organic materials, rayon, or other suitable fiber reinforcing material.

In one embodiment, the backing layer 22 is sufficiently stiff to provide good telegraph resistance, but sufficiently flexible to provide low weight and enable laminate structure 10 to be rolled on cores, for example 3-inch to 6-inch diameter cores, for ease of storage, transport and handling during application or installation. Telegraph resistance is an attribute of some structural laminates, for example, decorative NTF laminates, that keeps any unevenness in the underlying layer from being readily observed because of the stiffness of the NTF laminate. In addition, laminates available as continuous roll material offer economic advantages because less material is wasted when custom geometric pieces are cut from the roll.

The base layer 24 includes a layer of pretreated woven glass fabric or mat 24c. The glass component of glass layer 24c is pretreated by disposing glass fibers, sometimes in the form of a glass fabric or mat, in a polymer such as, for example, polyester, phenolic, epoxy, polysulfone, and mixtures thereof, or other similar polymers, to increase the smoothness of the surface, which enhances the capability of the surface to adhere to another surface, and to prevent the coatings applied thereto from impregnating the spaces between the fibers of the fabric.

Also included is an alloy layer 24a comprising polyurethane in combination with a homopolymer or a copolymer. The homopolymer or copolymer may be selected from a combination of known polymers, including but not limited to polyamide, polyester, polyether, polyimide, polyphenylene oxide, polystyrene and combinations thereof. In one embodiment, the copolymer comprises a terpolymer that may contain, for example, polyamide, polyester, and polyether, such that the base layer 24a as a whole includes from about 10% to about 100% polyurethane, and from about 10% to about 100% terpolymer, the terpolymer including from about 10% to about 100% of each of the polyamide, polyester, and polyether components.

Also included in base layer 24 is a primer layer 24b, disposed between the urethane/copolymer sub layer 24a and the glass sub layer 24c. Primer layer 24b generally comprises a PVC urethane composition, to enhance the adhesion of layers 24a and 24c, both of which include a urethane component. The primer layer could also be acrylic, urethane, epoxy, polyester or combinations thereof.

In one embodiment, the primer sub layer 24b is a thermoset adhesive containing a resin which can include, but is not limited to, polyester, polyurethane, epoxy, acrylic, and mixtures thereof. The amount of primer in sub layer 24b disposed between the base layer 24a and 24c is greater than about 0.25 oz. per square meter, in another example, the primer can range from about a 5 to about 4.0 oz. per square meter, in another example, from about 0.3 to about 25 oz. per square meter and in still another example, from about 0.5 to about 20 oz. per square meter. These amounts are based on a dry weight present in the laminate.

Finally, base layer 24 includes a very thin sealing sub layer 24d, comprising. PVC, which serves to prevent the glass fibers in sub layer 24c from etching the roller surface during the roll-forming process.

Known laminates include much higher percentages of PVC, which is not a significant component of the current laminate. In known laminates, the base layer comparable to sub layer 24a of this invention, generally is primarily comprised of PVC. PVC inherently releases high levels of halogen, particularly HCl, under conditions causing combustion. In addition, other components of known laminates may release $NO_x$, HF, $HB_r$, HCN, CO, $CO_2$ and $SO_2$ under these same conditions. Because the release of such halogens is harmful to those it comes in contact with and to the environment, efforts have been made to produce materials that have lower toxicity levels and yet exhibit the desirable wear characteristics of PVC. The laminate according to the invention eliminates PVC as a component of sub layer 24a, and instead comprises a polyurethane or a polyurethane alloy that renders a laminate product, when combined with a backing layer and a cap layer, that does not generate harmful halogen gases, particularly HCl, upon combustion. An additional benefit of the laminate of the invention is the generation of lower levels of smoke having these harmful components entratined therein.

The laminate of the invention may include one or more fiber-containing layers. Fiber materials which can be used in the backing layer 22, and as part of the base sub layer 24c, for example, can include, for example, glass, aramids, carbon, polyvinyl alcohol (PVA), hemp, jute, organic materials, and rayon. Depending upon the material of the fiber/woven fabric and its specific gravity, the aereal density of the laminate can vary from about 100 grams per square meter to about 400 gams per square meter and all ranges there between. For example, in various embodiments in which glass is used as the reinforced fiber, the aereal density of glass in at least one of the backing layer 22 and the base sub layer 24c ranges from about 200 to about 400 grams per square meter, in another embodiment from about 250 to about 350 grams per square meter, and in another embodiment from about 275 to about 325 grams per square meter. In another embodiment in which aramid fiber is used, the aereal density of the fiber/woven fabric of at least one of the backing layer 22 and the base sub layer 24c ranges from about 100 to about 300 grams per square meter, for example.

The laminate may further include adhesive layer 23, which is shown disposed between the backing layer 22 and the base layer 24. Adhesive layer 23 contains a thermoplastic resin which can include, but is not limited to, polyurethane, for example a polyester-based polyurethane, acrylic polyamide, epoxy polyvinyl alcohol, polyester, and mixtures thereof, as well as additional thermoplastic polymers having similar melting temperatures and adhesive properties. In another embodiment, adhesive layer 23 includes two or more thermoplastic polymers. For example, a suitable adhesive layer 23 may include, by weight, from about 70% to about 90% of a polymer as listed above, for example a polyester-based polyurethane, and also includes from about 10% to about 30% by weight of a second thermoplastic polymer selected from the group of polyamide, polyvinyl alcohol, polyester, phenoxy and mixtures thereof.

The amount of adhesive layer 23 present in laminate structure 10, and disposed between backing layer 22 and base layer 24, can range from about 30 to about 150 grams per square meter, in another example from about 70 to about 100 grams per square meter, and in still another example from about 70 to about 90 grams per square meter. The adhesive 23 may be, but does not have to be, a heat-activated adhesive which melts during lamination at elevated temperature as will be further described.

Figure 2:
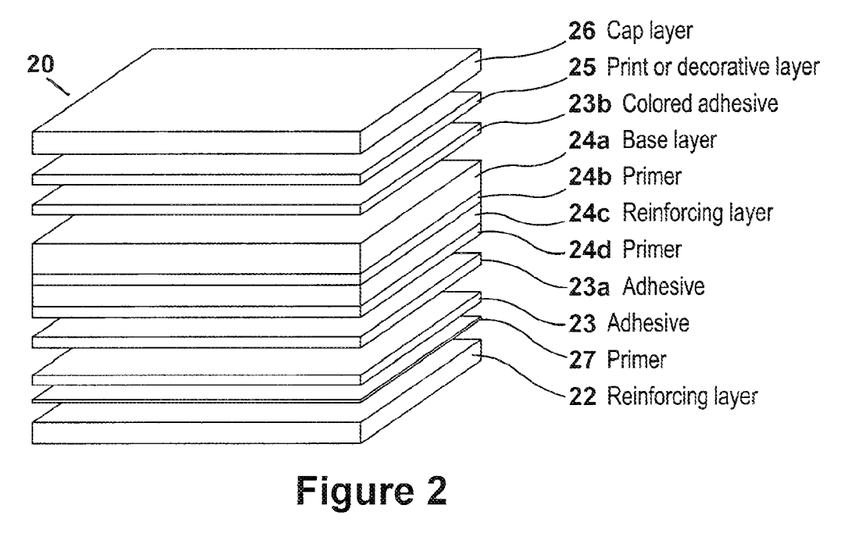
FIG. 2 is a perspective illustration of another optional laminate structure, according to an embodiment of the present invention.

Adhesive layer 23 optionally contains a flame retardant additive in quantities based on parts per hundred resin. As is shown in FIG. 2, additional adhesive layers 23a and or 23b may be included in the laminate structure. Generally, a flame retardant additive is included in at least adhesive layers 23 and 23a, though it may also be included in layer 23b. Suitable flame retardants include, but are not limited to, aluminum trihydrate, magnesium hydroxide, organophosphates, red phosphorous, phosphorus compounds, zinc borate, boric acid, oxides of boron, melamine(s), melamine derivatives such as salts thereof with organic or inorganic acids, ammonium polyphosphate, ammonium pentaborate, mixtures of zinc salts of alkali metals containing nano-clay and/or functionalized nano-metals, and mixtures thereof. The amount of flame retardant, alone or as a mixture of two or more flame retardant additives, can be present in up to about 40 parts per hundred resin, in another embodiment up to about 20 parts per hundred resin, in another embodiment up to about 15 parts per hundred resin, and in yet another embodiment up to about 10 parts per hundred resin, and all ranges there between. Also, it should be understood that a flame retardant additive is optional and therefore, in another embodiment, the adhesive 23 contains no flame retardant additive. That is, when the adhesive contains no flame retardant additive, any flame retardant performance if present in the adhesive layer would be characteristic of the inherent properties of the at least one thermoplastic polymer used in the adhesive layer 23.

FIG. 2 is an exploded view illustration of laminate structure 20 which includes all of the layers of laminate structure 10, and further includes optional print or decorative layer 25 and additional adhesive layers 23a and 23b and additional primer layer 27. A primer can be used to promote the adhesion of the adhesive layer. In both laminate structures 10 and 20 the composition of the adhesive and primer layers is generally different. For example, while both may be urethane-based material layers, each may contain additives particularly suited for certain purposes.

With further reference to FIG. 2, in another embodiment, laminate structure 20 includes a decorative layer 25. In one embodiment the decorative layer 25 is a layer disposed beneath cap layer 26 such that it is visible through the cap layer. Decorative layer 25 includes, but is not limited to, a polymer selected from acrylic, polyurethane, PVC and mixtures thereof. Decorative layer 25 may include a colorant or pigment or a so-called effect pigment such as aluminum or Nacre. Optionally, decorative layer 25 may be (i) opaque, or decorative layer 25 may be (ii) clear translucent, or decorative layer 25 may be (iii) colored translucent, or decorative layer 25 may be any combination of the foregoing. The laminate may, in some embodiments, include additional decorative layers including, but not limited to, at least one or more of, a print layer, a metal layer, a varnish, and/or a polymer. For example, a further decorative layer (not shown) can be at least one of a printed pattern, an embossed pattern which provides texture, and a color or pigment layer. The decorative layer 25 may further include at least one flame retardant additive, selected from but not limited to aluminum trihydrate, magnesium hydroxide, organophosphates, red phosphorous, phosphorus compounds, zinc borate, boric acid, oxides of boron, melamine(s), melamine derivatives such as salts thereof with organic or inorganic acids, ammonium polyphosphate, ammonium pentaborate, mixtures of zinc salts of alkali metals containing nano-clay and/or functionalized nano-metals, and mixtures thereof. The amount of flame retardant, alone or as a mixture of two or more flame retardant additives, can be present in up to about 40 parts per hundred resin, in another embodiment up to about 20 parts per hundred resin, in another embodiment up to 15 parts per hundred resin, and in yet another embodiment up to about 10 parts per hundred resin, and all ranges there between.

In other embodiments, the laminate structure 10 shown in FIG. 1 or 2 may obtain a textured, colored, or patterned appearance without the addition of decorative layer 25. In these embodiments, cap layer 26 may include a pigment. Alternatively, an adhesive layer 23b, having pigment disposed therein, may be disposed between base layer 24 and cap layer 26. In yet another alternative embodiment, pigment is disposed in both cap layer 26 and adhesive layer 23b. Additionally, pigment may be disposed in base layer 24 rather than or in addition to layers 23b and/or 26. In yet another embodiment, a texture or patterned appearance is imparted to the laminate 10 or 20 by embossing one or more surfaces of any of the foregoing layers 23b, 24, or 26, or any optional layer provided therebetween.

Figure 3:
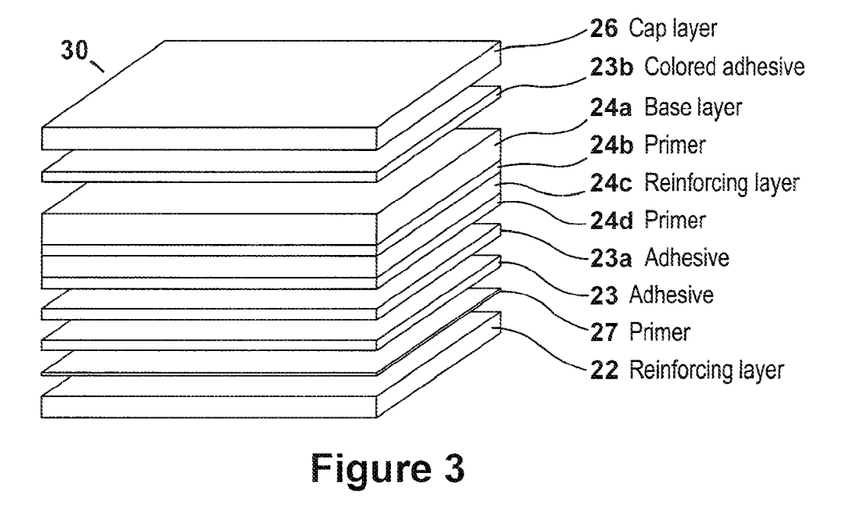
FIG. 3 is a perspective illustration of another optional laminate structure, according to an embodiment of the present invention.

With reference to FIGS. 2 and 3. FIG. 3 is an exploded view structure of the laminate structure 30 which includes all the layers and constituents of structure 20 with the exception of the print or decorative layer 25 and is another embodiment of the invention.

The cap layer 26 and base layer 24 are sometimes considered together as the "surface layer" of the laminate. This surface layer adheres well to the backing layer 22 such that the peel resistance between the surface layer and the backing layer 22, when tested according to the ISO 8510 standard test method used in the industry, performs extremely well. After aging for 500 hours at 70° C., the samples tested exhibited: peel resistance values of at least about 103 Newtons (N) per 25 millimeters (mm), and in another example, at least about 105 N/25 mm; and bondability, according to test method ISO 4578, ranging from about 31 to about 33.9 N/25 mm.

As set forth in Table 1, the laminate as described herein was tested in accord with ABD-0031 Standards. Three samples in accord with the invention were tested to generate the data presented in the Table. Each sample included the same or comparable backing and adhesive layers, i.e. samples 1 and 2 used phenolic backing material available commercially from M$^c$Gill, and sample 3 included a phenolic backing material prepared by the applicant. With regard to the base layers of the tested laminates, all three samples used the same seal, glass, and primer sub layers, and included a urethane-terpolymer sub layer as the main base layer, (24a in FIGS. 1 & 2). The use of the urethane-terpolymer composition, as opposed to the PVC composition of known laminates, renders significantly less HCl under combustion conditions. In addition, PVC-based laminates degrade quickly at high temperatures. Other known laminates contain silicone compositions, which have significantly inferior slip resistance, and are a thermoset and therefore cannot be recycled. Finally, all three samples tested included a polyurethane cap layer. The results in Table 1 verify that with regard to the production of smoke, under both flaming and non-flaming test conditions, the laminate of the invention recorded data well below acceptable industry standard levels. Further, when tested according to AITM 2 007, the laminate according to the invention released no HCl, and levels of other potentially toxic components well below acceptable levels. Table 1 provides full test data for all areas of performance critical to qualification of the laminate for use in the airbus transportation industry.

The laminate structures of the present invention are relatively light weight, having a maximum aereal density up to about 2300 grams per square meter, in another embodiment about 1800 to about 2100 gams per square meter or less, in another example, less than about 1800 grams per square meter, and in yet another example, an aereal density of about 1500 grams per square meter.

TABLE 1

| | | | | | | |
|---|---|---|---|---|---|---|
| ABD-0031 Specification | | | | | | |
| Property | Test Methods | Spec | Poly.2415 | Lubrizol | Poly.2415 | Poly.2415 |
| Texture | | | | | 92R | 92R |
| Color | | | | | Blue | Blue CM |
| Construction | | | Cap | Cap | Cap + Adh | Cap + Adh |
| Backing | | | McGill | McGill | 6100 | 6100 |
| Sample | | | RKH 001 | RKH002 | RKG 621 | RKG 622 |
| Thickness | ISO 2286-3 | | 69.8 mil | 64.7 mil | 57.7 | 62.4 |
| Weight | ISO 2286-2 | <2300 grams | 2087 | 1915 | 1933 | 1973 |
| UV (DE) | ASTM G-53(UVA 340) | Test 50.100 | no change | no change | 0.527/1.1 | .951/1.078 |

TABLE 1-continued

ABD-0031 Specification

| Property | | | Test Methods | Spec | Poly.2415 | Lubrizol | Poly.2415 | Poly.2415 |
|---|---|---|---|---|---|---|---|---|
| Static Coefficient of Friction | | Dry MD | ISO 8295 | >.25 | 0.973 | 1.022 | 0.816 | 0.687 |
| | | Wet MD | | | 0.83 | 0.878 | 0.706 | 0.59 |
| | | Dry XD | | | 1.066 | 0.999 | 0.919 | 0.631 |
| | | Wet XD | | | 0.845 | 0.755 | 0.704 | 0.637 |
| Dynamic Coefficient of Friction | | Dry MD | | >.25 | 0.678 | 0.875 | 0.73 | 0.594 |
| | | Wet MD | | | 0.76 | 0.779 | 0.617 | 0.545 |
| | | Dry XD | | | 0.709 | 0.781 | 0.845 | 0.58 |
| | | Wet XD | | | 0.716 | 0.605 | 0.642 | 0.523 |
| Dimensional Stability | | md/cmd | | <.2% | 0.13% | 0.10% | 0.00% | 0/0 |
| Curling | | | EN434(70° C. 1 week) | <10 mm. | fail | fail | fail | 9.75 |
| Abrasion (Loss of mass) | | | ISO 9352 | <1000 mg. | 0.5558 | 0.6525 | 0.2042 | 0.2289 |
| 50% Impact failure energy | | | Spec. Para 2.2 | >9J | 100% pass | 40% | 15.4 | 14.4 |
| Tear | | MD | ISO 4674-1 | >60 N | 166.7 | 78.3 | 186 | 131 |
| | | XD | Method A | | 190.3 | 122.3 | 181 | 182 |
| Peel Resistance (Top layer and reinforcement) | | MD | ISO 8510-2 | >50 N or CSF | >50 | >50 | CSF | CSF |
| | | XD | | | xxx | xxx | CSF | CSF |
| Peel Resistance (Top material and phenolic | | MD | | | 84.9 | 57.0 | 17.4 | 89.7 |
| | | XD | | | xxx | xxx | 34.6 | 56.4 |
| Bondability | | | ISO 4578 | >20 N | 31.47 | 33.9 | 29.8 | 32 |
| Scalability | | | ISO 11339 | No Air flow | Coh. (pass) | Coh. (pass) | | 66.4 |
| Formation of bubbles | | | Spec. Para 2.2 | no bubbles | pass | pass | no change | pass |
| Stain resistance | (Citric acid 10%) | | ISO 4586-2 | 5 rating | 5 | 5 | 5 | 5 |
| | (Red wine) | | Clause 15 | | 5 | 5 | 5 | 5 |
| | (20% urea) | | Procedure A | | 5 | 5 | 5 | 5 |
| Vertical Burn 12 sec. | (After flame)sec. | | Far 25.853 MD | <15 sec. | 0.8 | 5.11 | 0 | 5.3 |
| | (Drip time)sec. | | | <5 sec. | 0 | 0 | 0 | 0 |
| | (Burn length)in. | | | 203 mm. | 1.53 | 1.87 | 2 | 1.6 |
| | | | XD | <15 sec. | 5.2 | 4.7 | 1.76 | 6.48 |
| | | | | <5 sec. | 0 | 0 | 0 | 0 |
| | | | | 203 mm. | 1.0 | 1.53 | 1.46 | 1.46 |
| Heavy metals and antimony oxide | | | | None | None | None | None | XXX |
| Seaming | | | EN 684 | 250 N/50 mm. | 338 N | 409 N | 361 | 481 |
| NBS Smoke | (Flaming mode) | | ASTN E662 | <200 | 171.1 | 106.2 | 121.2 | 101.2 |
| | (Non flaming mode) | | Ds @ 4 min. | <200 | 120.7 | 131.2 | 146 | 113 |
| Toxicity Flaming (AITM 2.007) | | | HCN | 150 | 2.0 | 2 | 10, 10 | 10 |
| | | | CO | 1000 | 150.0 | 100 | 130 | 250 |
| | | | NO/NO$_2$ | 100 | 80, 50 | 70, 90 | 60, 80 | 40 |
| | | | NOx retest | 100 | 83.3 | 86.7 | | xxx |
| | | | SO$_2$/H$_2$S | 100 | 1.0 | 0 | 0 | 0 |
| | | | HF | 100 | 0.0 | 0 | 0 | 0 |
| | | | HCl | 150 | 0.0 | 0 | 0 | 0 |
| Toxicity Non-Flaming | | | HCN | 150 | 0.0 | 0 | 1 | 2 |
| | | | CO | 1000 | 0.0 | 0 | 0 | 50 |
| | | | NO/NO$_2$ | 100 | 0.0 | 0 | 0 | 20 |
| | | | SO$_2$/H$_2$S | 100 | 0.0 | 1 | 0 | 0 |
| | | | HF | 100 | 0.0 | 0 | 0 | 0 |
| | | | HCl | 150 | 0.0 | 0 | 0 | 0 |
| Blooming | | | No blooming @ 3 weeks | pass | pass | pass | XXX | pass |
| Peel Resistance after 500 hrs.@70° C. | | | ISO 8510-2 | >40 N or CSF | 103.1 | 105.4 | | CSF |
| Tear strength after 500 hrs.@70° C. (MD) | | | ISO 4674-1 | >50 N | 146.72 | 64.38 | | 131 |
| (XD) | | | Method A | | 158.78 | 86.92 | | 113 |

Laminate structures herein have an abrasion resistance shown by Taber abrasion testing, ISO 9352, with mass loss of less than about 653 milligrams, and in another embodiment, less than about 556 milligrams.

When tested according to FAA specifications, as set forth in Table 1, the laminate of the invention demonstrated a dynamic coefficient of friction between about 0.52 and 0.78 for wet and between about 0.58 and 0.87 for dry sled with either rubber or leather as described in FAR 25.793 Amendment 25-51 procedure A, all well above the required 0.25.

The laminates were also tested according to FAR 25.853 MD with regard to vertical burn. As shown in the table, the laminate is subjected to an open flame. The test records the time it takes for the sample to extinguish (must be less than 15 seconds), the drip time (must be less than 5 seconds), and the length of the char (must be less than 203 mm or 8.02 inches). As is seen in Table 1, the samples according to the invention recorded burn times of 0.8 sec., 5.11 sec., 5.3, 0 sec, all well below the 15 sec. limit. Drip time for all three samples was 0, and char lengths were 1.53 in., 1.6 in. 1.87 in and 2.0 in., again all well below the 8.02 in. threshold.

The tear strength of laminate structures herein is well above the required 50 Newtons, in one embodiment being greater than about 146 Newtons, and in another embodiment, greater than about 158 Newtons according to ISO 4674, method A.

In another embodiment, laminate structures herein are stain resistant as per ISO 4586-2, clause 15, method A, Procedure A, rating 5. An additional layer of adhesive, shown in FIG. 2 as adhesive layer 23b, may be added to the laminate as discussed hereinabove. The addition of this adhesive layer, disposed between the base layer 24 and the cap layer 26, provides unexpected abrasion resistance to the laminate structure. Table 1 shows, for example with respect to Sample 1, abrasion of 555.8 mg., according to standard test ISO 9352, which is well below the acceptable 1000 mg threshold. This test records milligrams of laminate abraided per 1000 revolutions of a wheel against the surface. With the addition of adhesive layer 23b, the laminate loses only 200 mg if un-pigmented and 400 mg if pigmented. Both results represent significant abrasion resistance improvement.

The laminate structure according to the invention may be made by a conventional roll-forming process, or other known laminating techniques. The resulting laminate may exhibit various dimensions, for example a fixed width along its length, such as about 1.5 meters wide, and variable length, for example, greater than about 6.5 meters long, in another example, from about 10 meters to about 25 meters long, and in another example, at least about 30 meters long.

Roll-forming processing parameters may vary depending on the chemistry of adhesive and primer and the thickness of the laminate. For example, processing temperatures may vary. The lamination step may be carried out at a relatively low surface temperature that ranges from about 170° F. to about 300° F., in another embodiment from about 170° to about 250° F., and in another embodiment from about 170° to about 220° F. Additionally, the pressure may vary from about 20 psi to about 40 psi. The roller speed can also vary and can range from about 2 meters/minute to about 5 meters/minute, and in other exemplary embodiments, from about 2.5 meters/minute to about 4 meters/minute.

It is to be understood that for purposes of the present specification and claims the range and ratio limits recited herein can be combined. For example, if ranges of 10 to 100 and 20 to 90 are recited for a particular parameter, it is understood that the ranges of 10 to 90 and 20 to 100 are also contemplated. Independently, if minimum values for a particular parameter are recited, for example, to be 1, 2, and 3, and if maximum values for that parameter are recited to be, for example, 8 and 9, then the following ranges are all contemplated: 1 to 8, 1 to 9, 2 to 8, 2 to 9, 3 to 8, and 3 to 9.

The following examples of dimensionally stable laminates made according to embodiments of the present invention are further disclosed, and do not otherwise limit the scope of the invention.

Laminates in keeping with the invention were prepare and performance tested, the data from those tests being presented in Table 1. An exemplary laminate composition, in accord with tested sample 1, is shown in Table 2.

TABLE 2

LAMINATE - SAMPLE 1

| LAYER* | Weight (g/m²) | % Composition |
|---|---|---|
| Urethane cap (26) | 243 | 12.47 |
| Urethane/terpolymer Base Layer (24a) | 981 | 50.30 |
| Primer Layer (24b) | 16.6 | 0.85 |
| Glass Layer (24c) | 218 | 11.19 |
| Adhesive (23a) | 33.20 | 1.7 |
| Adhesive (23) | 33.20 | 1.7 |
| Phenolic Backing (22) | 425 | 21.79 |
| Total | 1950 | 100 |

*numbers refer to FIGS. 1 & 2

The present invention is intended to include such modifications and alterations in so far as they fall within the scope of the appended claims or the equivalents thereof.

We claim:

1. A urethane based rigid flooring laminate comprising:
   a backing layer comprising a fiber reinforcement made from woven or non-woven fibers impregnated in a thermoset or thermoplastic polymer resin matrix;
   a first adhesive layer adjacent the backing layer;
   a base layer comprising a first primer layer, the base layer being an alloy layer made of polyurethane in combination with a terpolymer comprising polyamide, polyester and polyether or a combination thereof;
   a fiber reinforcing layer adjacent the base layer comprising a woven glass fabric or mat, wherein the fiber reinforcing layer comprises from about 250 grams per square meter to about 350 grams per square meter fiber reinforcement, the woven glass fabric or mat having been pretreated by disposing glass fibers in a polymer selected from the group consisting of polyester, phenolic, epoxy, polysulfone, and mixtures thereof to increase a smoothness of the fiber reinforcing layer to enhance the capability of the layer to adhere to another surface;
   a second primer layer adjacent the first adhesive layer, the second primer layer containing a fire retardant material;
   a cap layer comprising polyurethane; and
   the laminate structure having no significant amount of PVC in any component layer of the laminate so that the laminate meets the toxicity flaming and non-flaming test protocols pursuant to AITM 2.0007 with respect to HCN, CO, NO$_2$, SO$_2$/H$_2$S, HF, and HCl limits, said limits being less than 150, 1000, 100, 100, 100, and 150 respectively as measured by specific optical density, in addition to Federal Aviation Regulation 25.853 MD with regard to the parameters of vertical burn, drip time and char of the laminate, said limits being less than 15 seconds, 5 seconds and 203 mm respectively, and further having a tear strength of greater than 50 Newtons according to ISO 4674, method A, and an areal density of between 1800 and 2100 grams per square meter.

2. The laminate of claim 1, wherein the fiber reinforcing layer comprises at least one of glass, aramid, carbon PVA, hemp, jute, organic fiber or synthetic fiber disposed in a thermoset or thermoplastic resin.

3. The laminate of claim 1, wherein the first adhesive layer comprises thermoplastic polyurethane.

4. The laminate of claim 1, wherein the first adhesive layer comprises by weight, from about 50% to about 70% polymer and from about 30% to about 50% flame retardant additive.

5. The laminate structure of claim 1, further including a decorative layer.

6. A urethane-based laminate structure comprising:
   a fiber reinforced backing layer comprising, by weight, from about 40% to about 50% impregnated polyester, and from about 50% to about 60% by weight fiber reinforcement;
   a polyurethane alloy base layer comprising polyurethane in combination with a terpolymer comprising polyamide, polyester and polyether or a combination thereof;
   a reinforcing layer comprising a pretreated woven glass fabric or mat in combination with a polymer selected from the group consisting of: polyester, phenolic, epoxy, polysulfone or mixtures thereof, the woven glass fabric or mat having been pretreated by disposing glass fibers in a polymer selected from the group consisting of polyester, phenolic, epoxy, polysulfone, and mixtures thereof to increase a smoothness of the fiber reinforcing layer to enhance the capability of the layer to adhere to another surface;

a first adhesive layer disposed between the backing layer and the polyurethane alloy base layer, the adhesive layer comprising a thermoplastic polyurethane;

a primer layer disposed between the first adhesive layer and the backing layer;

a cap layer disposed on a surface of the polyurethane alloy base layer opposite the backing layer the cap layer comprising a polyurethane-based material; and a second adhesive disposed between the base layer and the cap layer, wherein the laminate has no significant amount of PVC and exhibits abrasion resistance of less than 400 mg according to ISO 9352; and the laminate structure having no significant amount of PVC in any component layer of the laminate so that the laminate meets the toxicity flaming and non-flaming test protocols pursuant to AITM 2.0007 with respect to HCN, CO, $NO_2$, $SO_2/H_2S$, HF, and HCl limits, said limits being less than 150, 1000, 100, 100, 100, and 150 respectively as measured by specific optical density, in addition to Federal Aviation Regulation 25.853 MD with regard to the parameters of vertical burn, drip time and char of the laminate, said limits being less than 15 seconds, 5 seconds and 203 mm respectively, and further having a tear strength of greater than 50 Newtons according to ISO 4674, method A, and an areal density of between 1800 and 2100 grams per square meter.

7. The laminate of claim 6 further comprising
one or more decorative or print layers disposed between the cap layer and the second adhesive layer.

8. A urethane-based laminate structure comprising:
a fiber reinforced backing layer comprising, by weight, from about 40% to about 50% impregnated polyester, and from about 50% to about 60% by weight fiber reinforcement;

a polyurethane alloy base layer comprising polyurethane in combination with a terpolymer comprising polyamide, polyester and polyether or a combination thereof;

a reinforcing layer comprising a pretreated woven glass fabric or mat in combination with a polymer selected from the group consisting of: polyester, phenolic, epoxy, polysulfone or mixtures thereof, the woven glass fabric or mat having been pretreated by disposing glass fibers in a polymer selected from the group consisting of polyester, phenolic, epoxy, polysulfone, and mixtures thereof to increase a smoothness of the fiber reinforcing layer to enhance the capability of the layer to adhere to another surface;

a first adhesive layer disposed between the backing layer and the polyurethane alloy base layer, the adhesive layer comprising a thermoplastic polyurethane;

a cap layer disposed on a surface of the polyurethane alloy base layer opposite the backing layer the cap layer comprising a polyurethane-based material; and a second adhesive disposed between the base layer and the cap layer, wherein the laminate has no significant amount of PVC in any component layer of the laminate so that the laminate meets the toxicity flaming and non-flaming test protocols pursuant to AITM 2.0007 with respect to HCN, CO, $NO_2$, $SO_2/H_2S$, HF, and HCl limits, said limits being less than 150, 1000, 100, 100, 100, and 150 respectively as measured by specific optical density, in addition to Federal Aviation Regulation 25.853 MD with regard to the parameters of vertical burn, drip time and char of the laminate, said limits being less than 15 seconds, 5 seconds and 203 mm respectively, and further having a tear strength of greater than 50 Newtons according to ISO 4674, method A, and exhibits abrasion resistance of less than 400 mg according to ISO 9352.

9. The laminate of claim 8 further comprising
a primer layer disposed between the adhesive layer and the reinforcing layer.

10. The laminate of claim 9, wherein
the second adhesive layer disposed between the base layer and the cap layer contains an organic or inorganic pigment.

11. The laminate of claim 10 further comprising
one of more decorative or print layers disposed between the cap layer and the second adhesive layer.

* * * * *